(12) United States Patent
Henzen et al.

(10) Patent No.: US 9,013,780 B2
(45) Date of Patent: Apr. 21, 2015

(54) ELECTROPHORETIC DISPLAYS

(76) Inventors: Alexander Victor Henzen, Bladel (NL);
Jan Groenewold, Diemen (NL)

( * ) Notice: Subject to any disclaimer, the term of this patent is extended or adjusted under 35 U.S.C. 154(b) by 0 days.

(21) Appl. No.: 13/642,632

(22) PCT Filed: Apr. 19, 2011

(86) PCT No.: PCT/EP2011/056266
§ 371 (c)(1),
(2), (4) Date: Jan. 7, 2013

(87) PCT Pub. No.: WO2011/131689
PCT Pub. Date: Oct. 27, 2011

(65) Prior Publication Data
US 2013/0208339 A1 Aug. 15, 2013

(30) Foreign Application Priority Data
Apr. 21, 2010 (EP) .................................. 10160579

(51) Int. Cl.
*G02B 26/00* (2006.01)
*G02F 1/167* (2006.01)
*G02F 1/1343* (2006.01)

(52) U.S. Cl.
CPC .......... *G02F 1/167* (2013.01); *G02F 1/134363* (2013.01); *G02F 2001/1676* (2013.01)

(58) Field of Classification Search
CPC ...... G02F 1/167; G09G 3/344; G02B 26/026; G02B 26/005
USPC .......................................... 359/296; 345/107
See application file for complete search history.

(56) References Cited

U.S. PATENT DOCUMENTS
2009/0027762 A1    1/2009 Comiskey et al.

FOREIGN PATENT DOCUMENTS
WO    WO 2010/015979    2/2010

OTHER PUBLICATIONS
International Search Report for PCT/EP2011/056266, mailed Jul. 15, 2011.

*Primary Examiner* — Tuyen Tra
(74) *Attorney, Agent, or Firm* — Nixon & Vanderhye P.C.

(57) ABSTRACT
Electrophoretic displays use motion of particles through a fluid to generate images. This invention describes the use of concerted motion of particles together with the solvent to generate optical switching.

13 Claims, 2 Drawing Sheets

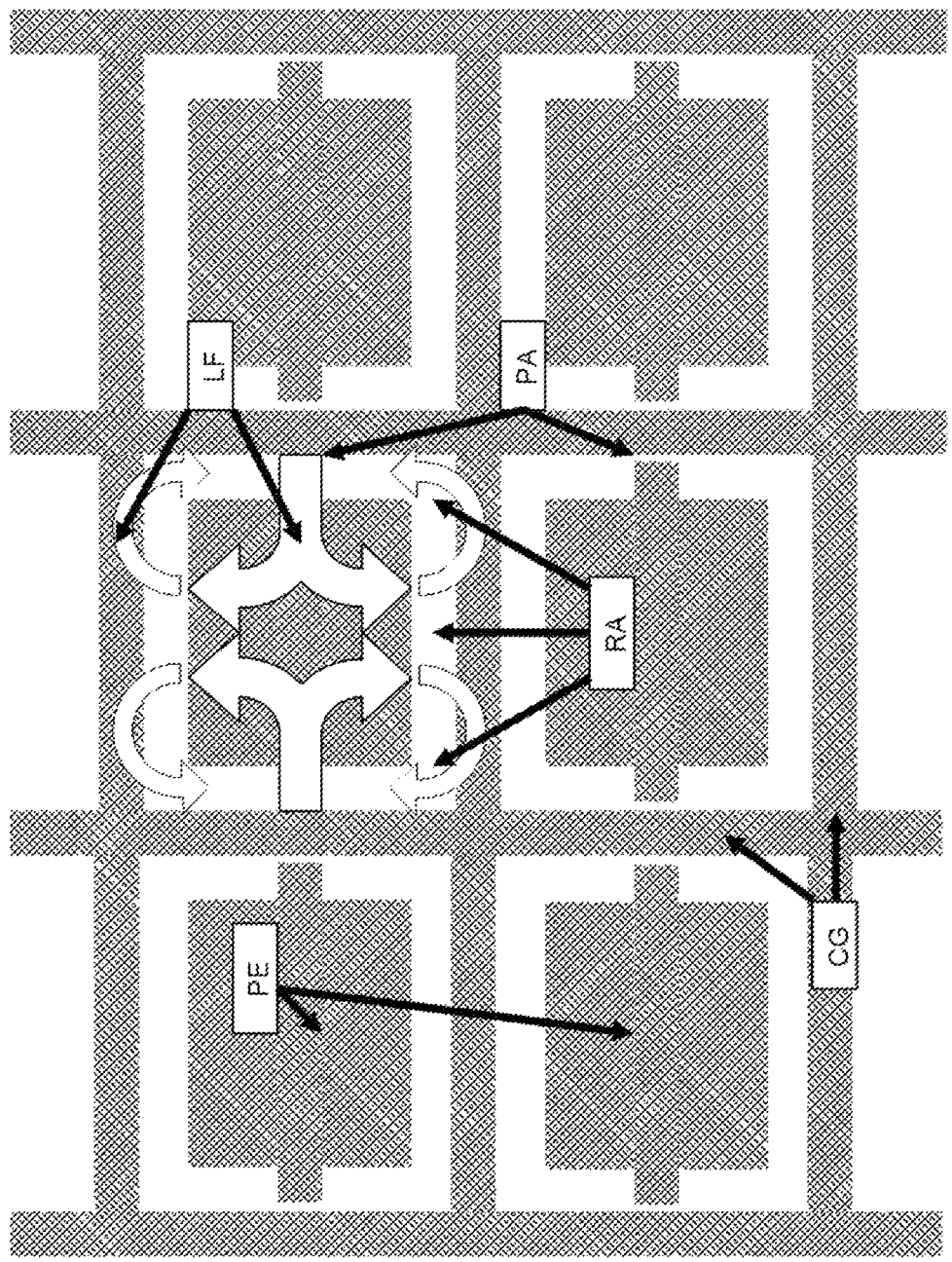

ELECTROPHORETIC DISPLAYS

FIELD OF THE INVENTION

The invention relates to an electrophoretic display.

This application is the U.S. national phase of International Application No. PCT/EP2011/056266 filed 19 Apr. 2011 which designated the U.S. and claims priority to EP 10160579.8 filed Apr. 21, 2010, the entire contents of each of which are hereby incorporated by reference.

BACKGROUND OF THE INVENTION

Electrophoretic displays have been the basis of electronic paper for several years now. On the way to improve the switching behaviour and create full color capability, it was suggested to use in-plane switching electrophoretic displays. However, rules for aperture and pixel size dictate that in-plane switching requires particles to travel relatively long distances. Since electrophoresis also requires particles to travel through viscous media, switching can take relatively long.

SUMMARY OF THE INVENTION

It is an object of the invention to create fast switching in-plane electrophoretic displays.

A first aspect of the invention provides an electro-osmotic display as claimed in claim 1. Advantageous embodiments are defined by the dependent claims.

To improve the relatively long switching, it is possible to use a slightly different principle, named electro-osmosis, where the particles don't travel through the stationary media, but rather travel together with the media. This creates liquid flow on a microscopic scale, that can transport absorbing particles onto and off a pixel electrode quickly and over relatively large distances. The layout of the electrode will then determine the accuracy and repeatability of the switching behaviour.

Electrophoretic particles show limited travel speeds through the suspending medium. In order to create fast switching in-plane electrophoretic displays, particles will need to move onto and off pixel areas fast, so preferably within tens of milliseconds. Since a typical pixel size is between 100 and 200 micrometer, particles must travel at a minimum speed of 10 micrometer per millisecond, or 10 millimeter per second. This is exceedingly high for electrophoretic motion. Typical electrophoretic displays move particles over a 30 micrometer distance in ~100 ms, translating to 0.3 mm per second. Electro-osmosis, however, can easily reach those speeds using liquid flowing together with the particles, unhindered by particle drag, and only overcoming the friction of the cell walls.

Electro-osmotic flow is not (or at least not intentionally) a naturally occurring phenomenon in electrophoretic displays. Current technology relies on transporting particles from one side of the display to the other (e.g. front to back), which will only work if the suspending liquid is stationary. Because of this, electrophoretic displays are what they are: Material parameters were optimized to advance electrophoretic motion, using relatively large particles in low viscosity liquids.

Transferring this optimization to in-plane electrophoretic systems is not easy, and will be limited by on one end the limited speed of electrophoretic particle motion, and on the other hand the impossibility of creating macroscopic flow. The main reason for this is incompressibility of liquids: it is impossible to create flow in opposite directions onto a pixel. Therefore if a system is created inducing flow, intending to move particles onto a pixel from opposite directions, a horizontal vortex will be created with a very small diameter (approximately the cell gap), limiting flow to the outer edges of the pixel only. No flow will occur in the pixel centre (see FIG. 1).

This problem must be overcome by tuning the pixel layout in such a way that vertical vortices are created, which are much larger (e.g. comparable to the pixel diameter) and allow liquid to freely flow onto and off the pixels. The layout of pixels can for example consist of a narrow "pumping area", which combines a small electrode distance with high field, and which exerts a high force upon the particles and therefore induces strong electro-osmotic flow, and a wider "escape area" next to it, which allows the liquid to leave the pixel again in the opposite direction. Other geometries are possible and may work just as well, as long as the "pumping" feature and "escape" feature are combined in each pixel.

In an electro-osmotic display in accordance with the first aspect of the invention the fluid itself carries a net charge and coloured particles suspended in the liquid also carry a charge, and both fluid and particles can be electrically controlled.

These and other aspects of the invention are apparent from and will be elucidated with reference to the embodiments described hereinafter.

BRIEF DESCRIPTION OF THE DRAWINGS

In the drawings:

FIG. 2 shows a top view of pixels in which a fast liquid flow can be induced, It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
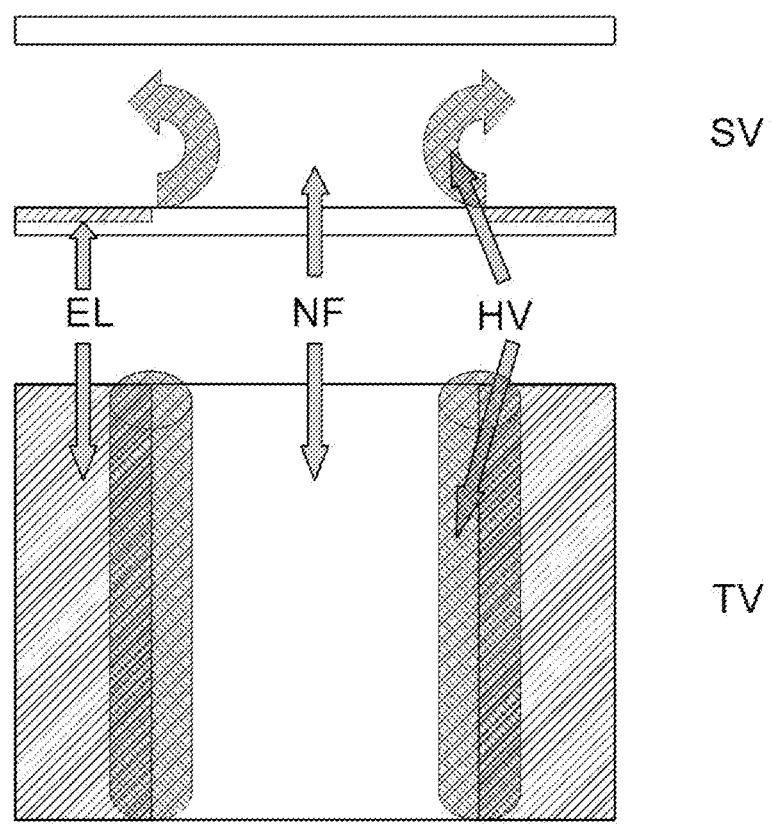
FIG. 1 shows a side view and a top view of a pixel in which the liquid flow is limited to the outer edges.

FIG. 1 shows a side view SV and a top view TV of a pixel in which the liquid flow is limited to the outer edges. The electrode is referred to as El. HV indicates a horizontal vortex and the reference NF means "no flow" of liquid.

FIG. 2 shows a top view of pixels in which a fast liquid flow can be induced. The common grid or storage electrode is indicated by CG and the pixel electrode or field electrode by PE. The pumping area is referred to as PA, the release area as RA and the liquid flow is indicated by the arrows LF.

The electrode pattern is formed by applying a "common grid" or "common lines" (often referred to as "storage electrode") CG, with pixel electrodes (also called "field electrodes") PE placed in the "common grid" apertures or between the lines CG (see FIG. 1). Each pixel consists of an area that constitutes the "pump area" PA, which is an area where a small gap between the "common grid" CG creates a high electric field.

This field exerts a force on the electro-osmotic fluid, inducing fast liquid flow. The liquid is then allowed to leave the pixel electrode again along the other edges of the display, where the pumping force is significantly smaller. To reach this mode of operation, the parameters of the electro-osmotic suspension need to conform to a certain set of parameters (not all these parameters are essential, some parameters are not critical at all):

(apparent) Particle size
    Not critical but typically 10 nm-500 nm, more typically 20 nm-100 nm.
    Particles must form a stable suspension, this is easier to achieve with smaller particles.
    Particles should not adhere permanently to the electrode. This can be achieved by 'internal charging' of the particles, or by a sufficiently thick stabilizing layer. In any case the separation between the charge on the particle and the electrode should be provided with a steric barrier in order to avoid particle binding by image charging.
Particle average charge and net charge while switching:
    Particle charge not critical. (typical 0.01 e to 10 e but governed by the build-up of surface charge).
    The surface electrode binds a percentage of the counter-ions (through mirror charges, covalently or otherwise.) 10 k/um3 10 e13e-/g 0.1 C/m3-100 C/m3 more typical 1-10 C/m3.
    In case of a particle charge $\ll 1$ e sufficient charge exchange between the particles should occur because otherwise part of the particles will remain uncharged on the relevant timescale of the device.
Particle concentration
    Concentration should be low enough to store all particles on the "common" electrode at the maximum hold voltage. This creates a dependency on cell gap as well. The maximum number of particles per mm2 of electrode area.
    30 g/l for 10 um gap, the numbers are dependent on the gap.
Cell gap
    Extinction times gap should be >95.
Suspending liquid (dielectric, viscosity)
    Any low viscosity, low dielectric constant is suitable. Preferred is er<4, more preferred <3.
Relation between pumping area and release area
    Relation adheres to formula: $W_p/L_p > W_{r,i}/L_{r,i}$ wherein:
        $W_p$ is the total pump area width
        $L_p$ is the total pump area length
        $W_{r,i}$ is the sum of all release area contributions
        $L_{r,i}$ is the sum of all release area lengths.
Pixel geometry
    The pixel area should be covered with two electrodes: a field electrode and a storage electrode.
    The field electrode must be transparent, to provide maximum aperture.
    The storage-electrode should be opaque. The storage electrode should preferably not exceed 20% of the total device area.
Driving voltage and waveform
    The driving voltage is not critical, but should overcome electrostatic repulsion of the particles. Typically, 5V-30V is used.
Counter-ions
    The counter-ion species should be selected in a way to facilitate surface charge adsorption. Small diameter, inorganic species are preferred. High tendency to adsorb to ITO-surface is also preferred.
Galvanic contact
    If there are excess counter ions which are not immobilized on the electrodes, it is desirable to make galvanic contact such that electron transfer can be achieved. This way screening by the counter ions can be minimized.
This invention can be applied in all displays using light modulation.
    Embodiment 1: very high reflectance monochrome display. A display cell is created using a technology largely the same as LCD. The pixels are formed using the geometry described here. The cell is filled with a suspension according to the parameters mentioned here. A diffuse reflector is placed behind the display. The resulting display is connected to drive electronics as is known from e.g. electrophoretic displays. The resulting monochrome display can now display images with reflectance comparable to normal printed paper.
    Embodiment 2: Multilayer color display. Starting from Embodiment 1, the display can be filled with colored particles. If these particles can be chosen to be primary colors, like Cyan, Magenta, Yellow, three of these displays can be stacked and yield a full color CMY display. Reflectance and saturation are better than can be achieved with present technologies.
    Embodiment 3: Transflective display. The same system as in Embodiment 1 or 2 can be provided with a backlight behind the display. The transmitted light from the backlight will be modulated by the display stack. Because of the much higher transmittance, the display requires much lower backlight power while achieving the same or better luminance.
    The invention is directed to an electro-osmotic display where the fluid itself carries a net charge and coloured particles suspended in the liquid also carry a charge, and both fluid and particles can be electrically controlled to both move in a pixel to change an optical state of the pixel.
    It should be noted that the above-mentioned embodiments illustrate rather than limit the invention, and that those skilled in the art will be able to design many alternative embodiments without departing from the scope of the appended claims.
    In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electro-osmotic display comprising:
    an electro-osmotic liquid which carries a net charge, and
    coloured particles which also carry a charge suspended in the electro-osmotic liquid, wherein
    both the electro-osmotic liquid and the coloured particles are capable of being electrically controlled, and wherein
    the electro-osmotic liquid is controlled for creating a flow of the electro-osmotic liquid to transport the coloured particles together with the electro-osmotic liquid.

2. An electro-osmotic display as claimed in claim 1, wherein the coloured particles are smaller than 500 nm.

3. An electro-osmotic display as claimed in claim 2, wherein the display has a pixel layout with vortices in a plane of the pixel, the vortices having dimensions in the order of a pixel diameter which allow the electro-osmotic liquid to flow onto and off the pixels.

4. An electro-osmotic display as claimed in claim 3, wherein the pixel layout comprises:
    a narrow pumping area which combines a small electrode distance with a high field and which exerts a high force upon the particles and the electro-osmotic liquid to thereby induce strong electro-osmotic flow onto the pixel, and a wider escape area next to the narrow pumping area which allows the electro-osmotic liquid to leave the pixel again in a different direction.

5. An electro-osmotic display as claimed in claim 3, wherein the pixel layout comprises a pumping area and an escape area, the pumping area having a smaller distance between a pixel electrode and a storage electrode than the escape area to induce an electro-osmotic flow of the electro-osmotic liquid onto the pixel and to allow the electro-osmotic liquid to leave the pixel electrode along the escape area.

6. An electro-osmotic display as claimed in 5, wherein the escape area is wider than the pumping area.

7. An electro-osmotic display as claimed in claim 1, wherein the coloured particles are smaller than 100 nm.

8. An electro-osmotic display as claimed in claim 1, wherein the coloured particles are stationary in the electro-osmotic liquid.

9. An electro-osmotic display comprising:
an electro-osmotic liquid which carries a net charge, and
coloured particles smaller than 500 nm which also carry a charge suspended in the electro-osmotic liquid, wherein both the electro-osmotic liquid and the coloured particles are capable of being electrically controlled, and wherein the electro-osmotic liquid is controlled for creating a flow of the electro-osmotic liquid to transport the coloured particles together with the electro-osmotic liquid, and wherein
the display has a pixel layout with vortices in a plane of the pixel.

10. The electro-osmotic display according to claim 9, wherein the vortices have dimensions in the order of a pixel diameter which allow the electro-osmotic liquid to flow onto and off the pixels.

11. The electro-osmotic display as claimed in claim 9, wherein the coloured particles are stationary in the electro-osmotic liquid.

12. The electro-osmotic display as claimed in claim 9, wherein the pixel layout comprises a pumping area and an escape area, the pumping area having a smaller distance between a pixel electrode and a storage electrode than the escape area to induce an electro-osmotic flow of the electro-osmotic liquid onto the pixel and to allow the electro-osmotic liquid to leave the pixel electrode along the escape area.

13. The electro-osmotic display as claimed in claim 12, wherein the escape area is wider than the pumping area.

\* \* \* \* \*